UNITED STATES PATENT OFFICE.

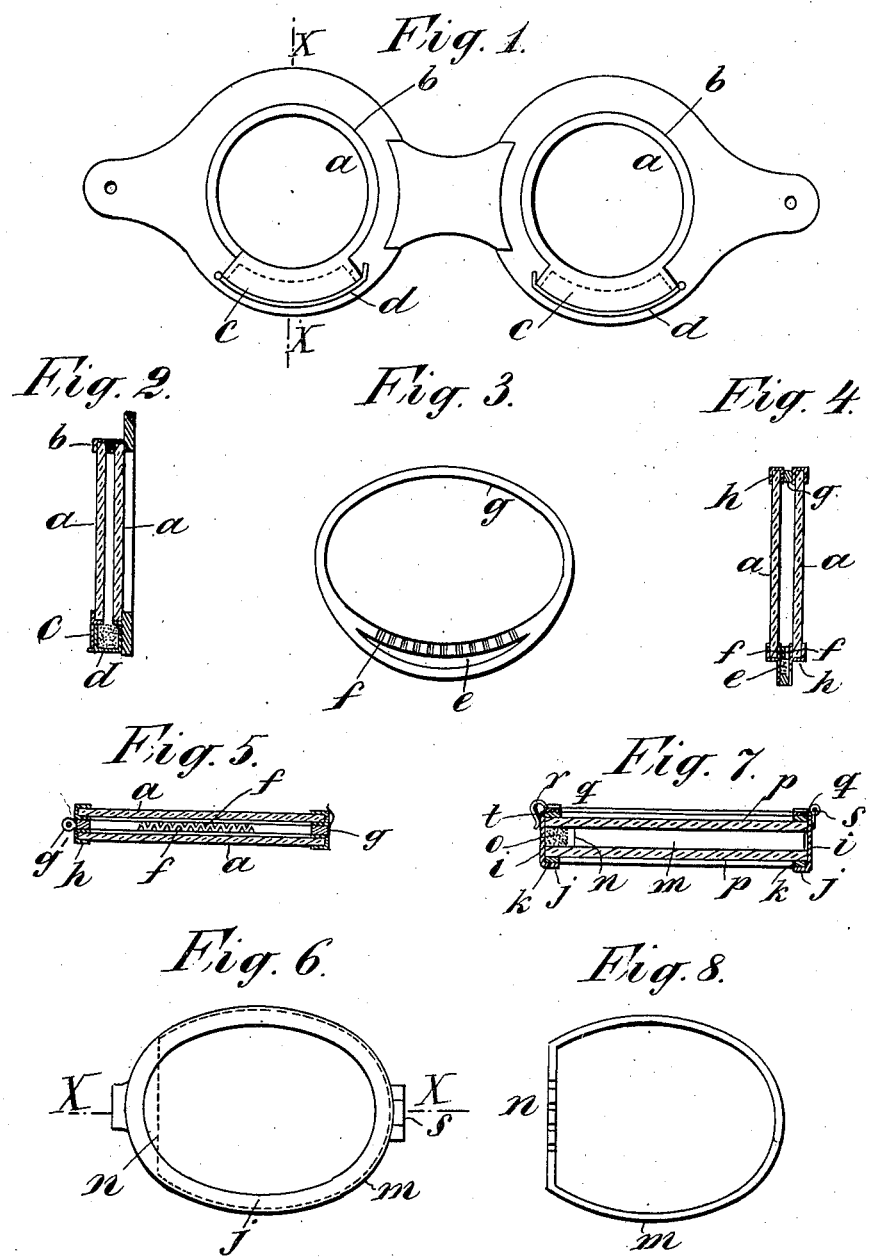

ROBERT ESNAULT-PELTERIE, OF BOULOGNE-SUR-SEINE, FRANCE.

MOTORIST'S GOGGLES.

968,401.  Specification of Letters Patent.  Patented Aug. 23, 1910.

Application filed February 8, 1907. Serial No. 356,422.

*To all whom it may concern:*

Be it known that I, ROBERT ESNAULT-PELTERIE, a citizen of the French Republic, and a resident of Boulogne-sur-Seine, France, have invented certain Improvements in Motorists' Goggles, of which the following is a specification.

This invention relates to certain improvements in motorists' goggles, and more particularly to that class of such devices which are adapted to prevent the formation of a mist on the glasses of the same, and the object of the invention is to provide a device of this general character, of a simple and comparatively inexpensive nature and of a light, compact and strong construction, which shall permit of convenient and effective operation and wherein are embodied certain features of novelty and improvement.

In cold weather, the inside surfaces of the glasses of motorists' goggles frequently become covered with a mist or condensation which prevents the driver from seeing clearly the road and obstacles encountered therein, and this constitutes a source of danger for motor car drivers which it is very desirable to remedy.

A further object of the invention is to avoid this disadvantage by a novel and improved construction of the goggles or other similar devices, wherein double glasses are employed spaced apart from each other, and it consists essentially in arranging in the place of each single glass in the frame of the goggles, two parallel glass plates having a very narrow space between them and also in placing in the lower part of the frame in a cavity communicating with the space inclosed between the two glasses, a desiccating substance such as lime, chlorid of calcium etc. By this arrangement three zones of temperature are formed one behind the other. The mist produced by the condensation of the vapor emanating from the eye of the driver is thus formed less readily because the fall in temperature between the inner face of the glass nearest to the eye and its outer face is less. The desiccating substance in the frame work serves solely to absorb aqueous vapor present in the intermediate space which is difficult of access and thus to obviate frequent cleaning thereof.

The novel features of the invention will be carefully defined in the claims.

In order that my improvements may be the better understood, I have illustrated in the accompanying drawings certain forms of my invention, in which drawings,—

Figure 1 is a front elevation of a pair of goggles showing one embodiment of the invention; Fig. 2 is a cross section on the line $x$—$x$ of Fig. 1; Fig. 3 is a view in elevation, detached, of a frame employed in a further embodiment of the invention; Fig. 4 is a vertical section through a goggle including a frame illustrated in Fig. 3; Fig. 5 is a longitudinal section of the same; Fig. 6 is a view in elevation of a still further embodiment of the invention; Fig. 7 is a section on the line $x$—$x$ in Fig. 6; Fig. 8 is a view in elevation, detached, of the frame employed in this latter embodiment.

As shown in Fig. 1, two plates of transparent material $a$—$a$, such as glass, are arranged parallel one to the other in a frame of suitable form comprising two sections $b$ of metal, of channel section and spaced at a very small distance apart. The said sections $b$ are so formed at their lower part as to constitute a receptacle for which is provided a lid $d$, preferably arranged at the side and in this receptacle $c$ is placed a desiccating substance, such as lime, chlorid of calcium, etc.

In the embodiment of my invention illustrated in Figs. 3, 4, and 5, the distance between the glasses $a$—$a$ is maintained by means of the frame or washer $g$, which is formed at its lower part with a perforated enlargement $e$ of crescent shape which serves as a receptacle for holding the desiccating substance. The part $f$ of this frame or washer is also cut away in such a manner as to form a series of notches which serve to place the part $e$ in communication with the space between the two glasses. The frame or washer $g$ is clamped in a suitable mount $h$ composed of two parts hinged one to the other, as at $g'$ in such a manner as to allow of opening the mount and renewing when necessary, the desiccating substance in the receptacle $e$.

In the embodiment disclosed in Figs. 6, 7, and 8, a space or receptacle is provided between the two glasses and into this space is introduced a porous body which has been impregnated or saturated with hygroscopic or desiccating substance, such for example, as fused calcium chlorid and elastic washers are interposed between the glasses and the rims of the mount or frame. For this purpose, the glasses of the goggles are fitted in a metal mount $i$ of desired configuration provided with a rim $j$. On the rim $j$ of this mount $i$ is first placed a caoutchouc washer $k$ with which the first glass $p$ contacts. Adjacent this glass is placed a frame $m$ approximating the configuration of the mount $i$ except that one end thereof is provided with a straight side or facet $n$. In the cavity formed between the mount $i$ and this straight side $n$, there is placed a suitable porous body $o$ having a segmental shape which has been impregnated with a suitable hygroscopic or desiccating material, such as chlorid of calcium. The second glass $p$ is then applied in position and is held therein by a washer $q$, which is kept in place by means of an oval piece $r$ hinged at $s$ to the mount and provided with a small spring fastener $t$ engageable with said mount for holding it in closed adjustment. The straight part or facet $n$ of the metal piece or frame $m$ may be provided with openings to facilitate the communication between the two glasses $p$, $p$ and the porous body $o$ containing the desiccating material. This porous body may be produced from refractory earth which has been previously impregnated with fused calcium chlorid, either in the anhydrous state or slightly hydrated.

It is obvious that this invention is not limited to motorists' goggles, but may be applied with good results to all kinds of goggles and other optical apparatus such, for example, as the windows of motor cars and the like, where it is important that there should be no mist or condensation upon the inner surface of the glass.

Having thus described my invention, what I claim and desire to secure by Letters Patent is:

1. A device of the character described having a frame, parallel glasses carried by the frame and spaced apart to afford a narrow air chamber between them, and a receptacle carried by the frame and adapted to contain a hygroscopic substance and capable of communication with the air chamber between the glasses to permit such substance to abstract the moisture from the air contained in said chamber.

2. A device of the character described having a frame, parallel glasses carried by the frame and spaced apart to afford a narrow air chamber between them, and a porous body carried by the frame, and exposed to the air contained in said air chamber and adapted to be impregnated with a hygroscopic substance capable of abstracting the moisture from the air contained in said air chamber.

3. A device of the character described having a frame, parallel glasses carried by the frame and spaced apart to afford a narrow air chamber between them, a receptacle carried by the frame and adapted to contain a hygroscopic substance and capable of communication with the air chamber between the glasses to permit such substance to abstract the moisture from the air contained in said chamber, an opening in the frame affording access to said receptacle for replenishing such hygroscopic substance and a removable cover for such opening.

4. A device of the character described having separable glasses parallel with each other, and a member interposed between said glasses and adapted to maintain them spaced apart to produce a narrow air chamber between them, and a receptacle carried by said interposed member and adapted to contain a hygroscopic substance and adapted for communication with the air chamber between the glasses to permit such substance to abstract the moisture from the air in said air chamber.

5. A device of the character described having separable glasses parallel with each other, means for holding said glasses in hinged relation, and a member interposed between said glasses and adapted to maintain them spaced apart to produce a narrow air chamber between them, and provided with a receptacle adapted to contain a hygroscopic substance and adapted for communication with the air chamber between the glasses to permit such substance to abstract the moisture from the air in said chamber.

6. A device of the character described having a frame comprising parts in hinged relation capable of movement toward and from each other, parallel glasses held between said parts, and a member interposed between said glasses and adapted to maintain them spaced apart to afford a narrow air chamber between them, and provided with a receptacle adapted to contain a hygroscopic substance and adapted for communication with said air chamber to permit such substance to abstract the moisture from the air contained in said chamber.

In witness whereof I have hereunto signed my name in presence of two witnesses.

ROBERT ESNAULT-PELTERIE.

Witnesses:
   JULES ARMENGAUD, Jeune,
   H. C. COXE.